United States Patent
Bezemer et al.

(10) Patent No.: US 10,035,138 B2
(45) Date of Patent: Jul. 31, 2018

(54) PROCESS FOR PREPARING A CHLORINE COMPRISING CATALYST, THE PREPARED CATALYST, AND ITS USE

(71) Applicant: SHELL OIL COMPANY, Houston, TX (US)

(72) Inventors: Gerrit Leendert Bezemer, Amsterdam (NL); Erwin Roderick Stobbe, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 34 days.

(21) Appl. No.: 14/906,909

(22) PCT Filed: Jul. 14, 2014

(86) PCT No.: PCT/EP2014/065059
§ 371 (c)(1),
(2) Date: Jan. 22, 2016

(87) PCT Pub. No.: WO2015/010941
PCT Pub. Date: Jan. 29, 2015

(65) Prior Publication Data
US 2016/0175820 A1     Jun. 23, 2016

(30) Foreign Application Priority Data
Jul. 24, 2013 (EP) ..................... 13177878

(51) Int. Cl.
| | | |
|---|---|---|
| *B01J 27/13* | (2006.01) | |
| *B01J 27/10* | (2006.01) | |
| *B01J 37/04* | (2006.01) | |
| *B01J 27/135* | (2006.01) | |
| *B01J 37/08* | (2006.01) | |
| *B01J 37/18* | (2006.01) | |
| *B01J 37/24* | (2006.01) | |
| *B01J 27/128* | (2006.01) | |
| *B01J 35/02* | (2006.01) | |
| *B01J 37/00* | (2006.01) | |
| *C10G 2/00* | (2006.01) | |
| *B01J 37/02* | (2006.01) | |
| *B01J 21/06* | (2006.01) | |
| *B01J 23/889* | (2006.01) | |

(52) U.S. Cl.
CPC ............ *B01J 27/135* (2013.01); *B01J 27/128* (2013.01); *B01J 27/13* (2013.01); *B01J 35/023* (2013.01); *B01J 37/0009* (2013.01); *B01J 37/0018* (2013.01); *B01J 37/0201* (2013.01); *B01J 37/0236* (2013.01); *B01J 37/08* (2013.01); *B01J 37/18* (2013.01); *B01J 37/24* (2013.01); *C10G 2/332* (2013.01); *B01J 21/063* (2013.01); *B01J 23/8892* (2013.01)

(58) Field of Classification Search
CPC .. B01J 21/135; B01J 23/8892; B01J 23/8896; B01J 27/13; B01J 27/10; B01J 35/023; B01J 37/0201; B01J 37/04; B01J 37/08; B01J 37/24; C07C 1/0435; C07C 2521/06; C07C 2523/34; C07C 2523/36; C07C 2523/75; C07C 2523/2523; C07C 2523/889; C10G 2/332; Y02P 20/52
USPC ............ 502/25, 27, 32, 224, 227, 229, 230; 518/709, 710, 715, 720, 721
See application file for complete search history.

(56) References Cited

U.S. PATENT DOCUMENTS

| | | | | |
|---|---|---|---|---|
| 2,768,961 | A * | 10/1956 | Weck | C07C 1/043 |
| | | | | 502/228 |
| 3,134,732 | A * | 5/1964 | Kearby | B01J 23/96 |
| | | | | 208/140 |
| 3,842,121 | A | 10/1974 | Ichikawa et al. | |
| 3,888,789 | A * | 6/1975 | Dombro | C08F 10/00 |
| | | | | 502/104 |
| 4,136,127 | A * | 1/1979 | Antos | B01J 23/8986 |
| | | | | 585/434 |
| 4,568,663 | A * | 2/1986 | Mauldin | B01J 23/75 |
| | | | | 502/325 |
| 4,585,798 | A * | 4/1986 | Beuther | B01J 23/75 |
| | | | | 502/332 |
| 4,595,703 | A | 6/1986 | Payne et al. | |
| 5,102,851 | A * | 4/1992 | Eri | B01J 23/8913 |
| | | | | 502/302 |
| 6,087,405 | A * | 7/2000 | Plecha | B01J 21/063 |
| | | | | 518/715 |
| 6,235,677 | B1 | 5/2001 | Manzer et al. | |

(Continued)

FOREIGN PATENT DOCUMENTS

| | | |
|---|---|---|
| WO | 8601500 | 3/1986 |
| WO | 9700231 | 1/1997 |

(Continued)

OTHER PUBLICATIONS

Rosynek et al.; "Effect of cobalt source on the reduction properties of silica-supported cobalt catalysts"; Applied Catalysis; vol. 73; pp. 97-112; 1991.
Bae et al.; "Effect of support and cobalt precursors on the activity of Co/AlPO4 catalysts in Fischer-Tropsch synthesis"; Journal of Molecular Catalysis A: Chemical vol. 311; pp. 7-16; 2009.
Feltes et al; "Selective adsorption of manganese onto cobalt for optimized Mn/Co/ti02 Fischer Tropsch catalysts"; Journal of Catalysis; vol. 270, No. 1; pp. 95-102; Mar. 22, 2010.

Primary Examiner — Patricia L. Hailey

(57) ABSTRACT

The invention concerns a process for preparing a chlorine comprising catalyst using one or more metal salts of chloride, hydrochloric acid (HCl), one or more organic chloride compounds, or a combination thereof. The prepared catalyst preferably comprises 0.13-3 weight percent of the element chlorine. The invention further relates to the prepared catalyst and its use.

10 Claims, No Drawings

(56) References Cited

U.S. PATENT DOCUMENTS

| | | | |
|---|---|---|---|
| 6,759,440 B2* | 7/2004 | Geerlings | B01J 23/889 |
| | | | 518/715 |
| 2001/0051588 A1 | 12/2001 | Herron et al. | |
| 2006/0166809 A1* | 7/2006 | Malek | B01J 20/02 |
| | | | 502/20 |
| 2007/0123594 A1* | 5/2007 | Dogterom | B01J 21/066 |
| | | | 518/716 |
| 2009/0023822 A1* | 1/2009 | Tijm | C10G 2/342 |
| | | | 518/715 |
| 2010/0048742 A1 | 2/2010 | Ellis et al. | |
| 2016/0160128 A1* | 6/2016 | Stobbe | B01J 37/18 |
| | | | 518/715 |
| 2016/0175820 A1* | 6/2016 | Bezemer | B01J 37/08 |
| | | | 518/715 |

FOREIGN PATENT DOCUMENTS

| | | |
|---|---|---|
| WO | 9934917 | 7/1999 |
| WO | 2003018481 | 3/2003 |
| WO | 2008071640 | 6/2008 |

* cited by examiner

PROCESS FOR PREPARING A CHLORINE COMPRISING CATALYST, THE PREPARED CATALYST, AND ITS USE

PRIORITY CLAIM

The present application is the National Stage (§ 371) of International Application No. PCT/EP2014/065059, filed Jul. 14, 2014, which claims priority from European Patent Application No. 13177878.9, filed Jul. 24, 2013 incorporated herein by reference.

The present invention relates to a process for preparing a chlorine comprising catalyst. The catalyst is suitable for use in producing normally gaseous, normally liquid and optionally normally solid hydrocarbons from synthesis gas generally provided from a hydrocarbonaceous feed, for example a Fischer-Tropsch process. The invention further relates to the catalyst and the use thereof in Fischer-Tropsch processes.

The Fischer-Tropsch process can be used for the conversion of synthesis gas (from hydrocarbonaceous feed stocks) into liquid and/or solid hydrocarbons. Generally, the feed stock (e.g. natural gas, associated gas and/or coal-bed methane, heavy and/or residual oil fractions, coal, biomass) is converted in a first step into a mixture of hydrogen and carbon monoxide (this mixture is often referred to as synthesis gas or syngas). The synthesis gas is then fed into a reactor where it is converted in one or more steps over a suitable catalyst at elevated temperature and pressure into paraffinic compounds and water. The obtained paraffinic compounds range from methane to high molecular weight hydrocarbons. The obtained high molecular weight hydrocarbons can comprise up to 200 carbon atoms, or, under particular circumstances, even more carbon atoms.

Numerous types of reactor systems have been developed for carrying out the Fischer-Tropsch reaction. For example, Fischer-Tropsch reactor systems include fixed bed reactors, especially multi-tubular fixed bed reactors, fluidised bed reactors, such as entrained fluidised bed reactors and fixed fluidised bed reactors, and slurry bed reactors such as three-phase slurry bubble columns and ebulated bed reactors.

Catalysts used in the Fischer-Tropsch synthesis often comprise a carrier based support material and one or more metals from Group 8-10 of the Periodic Table, preferably from the cobalt or iron groups, optionally in combination with one or more metal oxides and/or metals as promoters selected from zirconium, titanium, chromium, vanadium and manganese, more preferably manganese and rhenium, most preferably manganese. Such catalysts are known in the art and have been described for example, in the specifications of WO 9700231A and U.S. Pat. No. 4,595,703.

One of the limitations of a Fischer-Tropsch process is that the activity of the catalyst will, due to a number of factors, decrease over time. There is a need for catalysts that are stable over a long period of time.

During a Fischer-Tropsch process paraffinic compounds ranging from methane to high molecular weight hydrocarbons are formed. There is a need for catalysts that have a high selectivity towards $C_5+$ hydrocarbons.

The formation of carbon dioxide during a Fischer-Tropsch process is preferably kept as low as possible. There is a need for catalysts that have a low selectivity towards $CO_2$.

The Fischer-Tropsch reaction is very exothermic and temperature sensitive. In consequence, careful temperature control is required to maintain optimum operation conditions and desired hydrocarbon product selectivity. The fact that the reaction is very exothermic also has the consequence that when temperature control is not adequate, the reactor temperature can increase very quickly, which carries the risk of a reactor runaway. A reactor runaway may result in highly increased temperatures at one or more locations in the reactor. A reactor runaway is a most undesirable phenomenon, as it may result in catalyst deactivation which necessitates untimely replacement of the catalyst, causing reactor downtime and additional catalyst cost.

A high-speed stop may, for example, be required when the temperature in the Fischer-Tropsch reactor increases to an unacceptable value either locally or over the entire reactor, when there is an interruption in the gas flow, or in the case of other unforeseen circumstances. When there is a threat of a runaway, it is often wise to stop the reaction as quick as possible. Several processes for carrying out a high-speed stop in a Fischer-Tropsch reactor have been developed.

When a high-speed stop is carried out in a fixed-bed reactor, a raise in temperature, culminating in a process-side temperature peak is often observed. If a process-side temperature peak is observed, it is usually observed at the upstream side of the catalyst bed. A process-side temperature peak is generally caused by a decrease in gas space velocity which leads to an increased conversion, accompanied by increased heat formation, and simultaneously to a decrease in heat removal capacity.

The peak temperature increase can be minimised by choosing the right method for the high-speed stop, but it will nevertheless have some influence on the catalyst. Therefore, there is need for a Fischer-Tropsch catalyst which is well able to withstand any kind of process for carrying out a high-speed stop in a Fischer-Tropsch process.

It is one object of the present invention to provide a process for preparing an improved cobalt comprising Fischer-Tropsch catalyst.

U.S. Pat. No. 3,842,121 discloses a catalyst capable of synthesizing various hydrocarbons from a mixture of hydrogen and carbon monoxide. With the catalyst a $C_2$ hydrocarbon, such as ethylene and ethane can be obtained in high conversion. In Example 4 of U.S. Pat. No. 3,842,121 a catalyst prepared from cobalt chloride, graphite and potassium mainly produces $C_2$ hydrocarbons and shows a higher selectivity towards $C_2$ hydrocarbons as compared to a catalyst prepared from graphite and potassium.

M. P. Rosynek et al. in Applied Catalysis, 73 (1991) 97-112 tested silica-supported cobalt catalysts that were prepared using cobalt nitrate, cobalt chloride, or cobalt acetate. They report that there appeared to be no direct relationship between catalytic activity and the ease or extent of metal reduction. When directly reduced for 16 hours at 400° C., and not calcined at a higher temperature before reduction, catalysts prepared with cobalt chloride showed a very low initial activity in the Fischer-Tropsch reaction. The initial activity was much lower than the initial activity of catalysts prepared with cobalt nitrate or cobalt acetate, and may be due to residual surface chloride. After calcination for 16 hours at 500° C. and reduction for 16 hours at 400° C. catalysts prepared with cobalt chloride showed a slightly lower selectivity as compared to catalysts prepared with cobalt nitrate or cobalt acetate.

J. W. Bae et al. in Journal of Molecular Catalysis A: Chemical 311 (2009) 7-16 discuss a preparation method for cobalt comprising catalysts. The support of the catalysts is aluminum phosphate ($AlPO_4$). The cobalt was applied by means of impregnation using cobalt nitrate, cobalt acetate or cobalt chloride. The residue of chlorine of 3.8 wt % on the catalysts prepared using cobalt chloride was not removed efficiently even after calcination for 5 hours at 500° C. After activation at for 12 hours at 400° C. with a hydrogen comprising gas the catalysts prepared using cobalt chloride showed higher methane and $C_2$-$C_4$ selectivities, and lower $C_5$-$C_7$ and $C_8$+ selectivities, as compared to the catalysts prepared using cobalt nitrate or cobalt acetate.

US2010/0048742A1 relates to cobalt comprising Fischer-Tropsch catalysts. The support consists of aluminum and lithium. In case a precipitated alumina is used to prepare the catalyst, US2010/0048742A1 teaches to wash the alumina to remove contaminants such as chlorine. Additionally, the lithium oxide containing support may be washed to remove chlorine, prior to combining the support with cobalt compounds. US2010/0048742A1 teaches that chlorine contaminants may reduce the Fischer-Tropsch catalyst activity and/ or selectivity towards $C_5$+ hydrocarbons.

WO2008071640A2 describes a method of preparing a Fischer-Tropsch catalyst. In step (a) a promoter is contacted with a carrier material, step (b) is a drying step, and in step (c) cobalt is added. The promoter preferably is manganese. In one embodiment a minor amount of cobalt is already added in step (a) of the process of WO2008071640A2, followed by adding a further amount of cobalt in step (c) of the process. When manganese and cobalt are added in step (a), the weight of the cobalt atoms preferably is less than 10 wt % calculated on the total weight of cobalt and manganese atoms that is contacted with the carrier material in step (a). The major amount of cobalt is always applied in step (c) of the process of WO2008071640A2. A long list of possible cobalt sources is indicated for step (c).

WO8601500A1 discloses a method in which cobalt is impregnated on a carbon support, for example using cobalt nitrate. A small amount of chlorine is applied using a non-metallic chlorine compound, for example ammonium chloride. WO8601500A1 explains that the disclosed method is particularly useful when applied to catalysts comprising cobalt or iron on a support whereby the support is a carbon having a BET surface area of at least 100 m2/g, a ratio of BET to basal plane surface area not greater than 4:1, and a ratio of basal plane surface area to edge surface area of at least 10:1. WO8601500A1 teaches against the use of a metallic chlorine compound on a carbon support.

According to one aspect of the present invention, there is provided a process for the preparation of a Fischer Tropsch catalyst, comprising the steps of:
(a) contacting
  cobalt and/or a cobalt compound;
  one or more promoter(s), whereby the promoter preferably comprises manganese, rhenium, Group 8-10 noble metals, or mixtures thereof, more preferably manganese or rhenium, most preferably manganese;
  one or more metal salts of chloride, hydrochloric acid (HCl), one or more organic chloride compounds, or a combination thereof; and
  a liquid;
  optionally one or more co-catalyst(s) or precursor (s) therefor;
  with titania;
(b) drying and/or calcining the material obtained in step (a) at a temperature in the range of 70 to 600, preferably 70 to 500° C., more preferably 70 to 350° C., whereby the material obtained in step (b) comprises:
  at least 5 weight percent cobalt, preferably in the range of between 5 to 35 weight percent cobalt, more preferably in the range of between 10 to 35 weight percent cobalt, even more preferably in the range of between 15 to 30 weight percent cobalt, still more preferably in the range of between 15 to 25 weight percent cobalt, calculated on the total weight of the catalyst,
  in the range of between to 0.1 to 15 weight percent promoter, preferably in the range of between 0.5 to 5 weight percent promoter, calculated on the total weight of the catalyst,
  and 0.13-4, preferably 0.15-3, weight percent of the element chlorine, calculated on the total weight of the catalyst.

Preferably, the Fischer-Tropsch catalyst that is provided in step (a) comprises in the range of between to 0.1 to 15 weight percent manganese, rhenium, Group 8-10 noble metals, or mixtures thereof, preferably in the range of between 0.5 to 5 weight percent manganese, rhenium, Group 8-10 noble metals, or mixtures thereof, more preferably 0.5 to 5 weight percent manganese calculated on the total weight of the catalyst.

Titania is used in step (a) of the process for the preparation of a Fischer Tropsch catalyst of the present invention. Titania is also referred to as a refractory oxide. The titania used preferably is porous titania. Titania serves as carrier material in the catalyst that is prepared with the process.

In step (a) further carrier materials may be added. The carrier of the prepared catalyst may comprise up to 10 weight percent of another refractory oxide, calculated on the total weight of carrier material. The carrier of the catalyst may, for example, comprise silica, alumina, zirconia, ceria, gallia and mixtures thereof, especially silica and/or alumina, in addition to the titania.

Preferably more than 90 weight percent of the carrier material consists of titania, more preferably more than 95 weight percent, calculated on the total weight of the carrier material. As an example of a suitable titania can be mentioned the commercially available Titanium Dioxide P25 ex Evonik Industries.

Cobalt and/or a cobalt compound is contacted with titania in step (a) of the process of the present invention. Cobalt serves as catalytically active metal in the catalyst that is prepared with the process. Cobalt may be added to the titania in the form of, for example, cobalt hydroxide, CoOOH, cobalt oxide, a co-precipitate of cobalt and manganese hydroxide, a cobalt nitrite, or a cobalt ammonium complex, for example cobalt ammonium carbonate.

Cobalt and/or a cobalt compound is contacted in such an amount with the titania and the other ingredients for the catalyst that the catalyst that is prepared comprises, after drying and/calcination, at least 5 weight percent cobalt, preferably in the range of between 5 to 35 weight percent cobalt, more preferably in the range of between 10 to 35 weight percent cobalt, even more preferably in the range of between 15 to 30 weight percent cobalt, still more preferably in the range of between 15 to 25 weight percent cobalt, calculated on the total weight of the catalyst. The necessary amount of cobalt or cobalt compound can be easily calculated based on the total dry mass used in the preparation process of the present invention.

Promoter is contacted in such an amount with the titania and the other ingredients for the catalyst that the catalyst that is prepared comprises, after drying and/calcination, in the range of between to 0.1 to 15 weight percent promoter, preferably in the range of between 0.5 to 5 weight percent promoter, calculated on the total weight of the catalyst. The promoter preferably comprises manganese, rhenium, Group 8-10 noble metals, or mixtures thereof, more preferably manganese or rhenium, most preferably manganese. The necessary amount of promoter can be easily calculated based on the total dry mass used in the preparation process of the present invention.

The liquid used in step (a) may be any suitable liquid known in the art, for example: water, ammonia; alcohols, such as methanol, ethanol and propanol; ketones, such as acetone; aldehydes, such as propanol and aromatic solvents, such as toluene, and mixtures of the aforesaid liquids. A most convenient and preferred liquid is water.

In step (a) titania is contacted with one or more metal salts of chloride, hydrochloric acid (HCl), one or more organic chloride compounds, or a combination thereof.

Suitable organic chloride compounds have the potential to release a chloride ion when in solution.

The organic chloride compounds preferably is/are acyl chlorides, such as propionic acid chloride; alkyl ammonium chlorides, such as tetra butyl ammonium chloride; or mixtures thereof.

The metal salt(s) of chloride preferably is/are a chloride of manganese, cobalt, vanadium, titanium, silver, gold, zinc, platinum, palladium, zirconium, ruthenium, rhenium, rhodium, chromium, nickel, iron, osmium, or iridium or mixtures thereof. More preferably the metal salt(s) of chloride is/are a chloride of manganese, cobalt, silver, gold or zinc or mixtures thereof. Even more preferably the metal salt(s) of chloride is/are a chloride of manganese or cobalt, or mixtures thereof.

The metal salt(s) of chloride more preferably is/are a chloride of manganese such as manganese chloride ($MnCl_2$) and manganese chloride tetrahydrate ($Mn(H_2O)_4Cl_2$); a chloride of cobalt such as cobalt chloride ($CoCl_2$), hydrated cobalt chloride ($Co(H_2O)_6Cl_2$) and hexamminecobalt chloride ($[Co(NH_3)_6]Cl_3$); a chloride of silver such as silver chloride (AgCl); or a chloride of gold such as auric chloride ($AuCl_3$), gold chloride (AuCl) and chloroauric acid ($HAuCl_4$); zinc chloride (ZnCl) or mixtures thereof, more preferably manganese chloride ($MnCl_2$) and/or cobalt chloride ($CoCl_2$).

The one or more metal salts of chloride, hydrochloric acid (HCl), one or more organic chloride compounds, or a combination thereof, may be contacted with titania as a solvent of one or more of these chlorine comprising compounds in a liquid. Such a liquid may be any suitable liquid known in the art, for example: water, ammonia; alcohols, such as methanol, ethanol and propanol; ketones, such as acetone; aldehydes, such as propanol and aromatic solvents, such as toluene, and mixtures of the aforesaid liquids. A most convenient and preferred liquid is water.

In the process, the chlorine comprising compound(s) is/are contacted in such an amount with the titania and the other ingredients for the catalyst, and is dried and/or calcinated at such a temperature and duration, that the catalyst that is prepared comprises 0.13-4, preferably 0.15-3, weight percent of the element chlorine, calculated on the total weight of the catalyst.

A chlorine comprising catalyst prepared according to the present invention preferably comprises 0.13-3, more preferably 0.15-3, even more preferably 0.15-2, still more preferably 0.15-1, still more preferably 0.15-1, still more preferably 0.15-0.7, most preferably 0.15-0.5 weight percent of the element chlorine, calculated on the total weight of the catalyst.

A chlorine comprising catalyst prepared according to the present invention preferably comprises 0.2-1, more preferably 0.2-0.7, even more preferably 0.2-0.5 weight percent of the element chlorine, calculated on the total weight of the catalyst.

The total amount of the element chlorine on the catalyst that is prepared according to the present invention can be adjusted with the amount of chlorine comprising compound(s) used in step (a), the temperature of the drying and/or calcination in step (b), and the duration of the drying and/or calcination in step (b).

Preferably the titania is contacted in step (a) with such an amount of chlorine comprising compound(s) that the material obtained in step (a), before drying and/or calcination, comprises 0.13-6, preferably 0.15-6, more preferably 0.15-3, even more preferably 0.15-2.5, still more preferably 0.15-2 weight percent of the element chlorine, calculated on the total weight of the material obtained in step (a).

During a method according to the present invention chlorine may or may not be removed from the catalyst during step (b), depending on the amount of chlorine applied in step (a) and the heating temperature and duration of step (b).

In a preferred embodiment the desired amount of chlorine up to twice as much is applied in step (a) and the heating temperature in step (b) is in the range of 70 to 350° C., and the catalyst is heated for at least 15 minutes up to 1 day, preferably for at least 15 minutes up to 5 hours.

The amount of the element chlorine on the obtained catalyst can be regulated by choosing the amount of chlorine applied in step (a) within the ranges provided in this document for step (a), and by choosing the temperature and duration of the heating of step (b) within the ranges provided in this document for step (b). This is simple for a person skilled in the art. Additionally, the examples below illustrate how this may be performed.

In the process of the present invention also one or more further components, such as co-catalysts, may be added to the titania.

Suitable co-catalysts include one or more metals such as iron, nickel, or one or more noble metals from Group 8-10 of the Periodic Table of Elements. Preferred noble metals are platinum, palladium, rhodium, ruthenium, iridium and osmium. Such co-catalysts are usually present in small amounts.

References to "Groups" and the Periodic Table as used herein relate to the new IUPAC version of the Periodic Table of Elements such as that described in the 87th Edition of the Handbook of Chemistry and Physics (CRC Press).

In the process of the invention, the catalyst may be shaped or formed by means of spray drying, pelletizing, (wheel) pressing, extrusion, or application on a metal support (like a metal wire or a metal flake). Shaping or forming may be performed before or during the drying and/or calcination step b).

For example, the liquid, the promoter(s), the chlorine comprising compound(s), and a cobalt compound, preferably cobalt hydroxide, CoOOH, cobalt oxide, or a co-precipitate of cobalt and manganese hydroxide, may be contacted with the titania, followed by extrusion. After extrusion the extrudates are dried and/or calcinated in step b).

When a carrier material is shaped, it may be advantageous to add a binder material, for example to increase the mechanical strength of the catalyst. Additionally or alternatively, a liquid may be added to the carrier material before or during its shaping. The liquid may be any of suitable liquids known in the art, for example: water; ammonia, alcohols, such as methanol, ethanol and propanol; ketones, such as acetone; aldehydes, such as propanol and aromatic solvents, such as toluene, and mixtures of the aforesaid liquids. A most convenient and preferred liquid is water. The liquid may include viscosity improvers such as a polyvinylalcohol.

In case of extrusion, one may want to improve the flow properties of the carrier material. In that case it is preferred to include one or more flow improving agents and/or extrusion aids prior to extrusion. Suitable additives include fatty amines, quaternary ammonium compounds, polyvinyl pyridine, sulphoxonium, sulphonium, phosphonium and iodonium compounds, alkylated aromatic compounds, acyclic mono-carboxylic acids, fatty acids, sulphonated aromatic compounds, alcohol sulphates, ether alcohol sulphates, sulphated fats and oils, phosphonic acid salts, polyoxyethylene alkylphenols, polyoxyethylene alcohols, polyoxyethylene alkylamines, polyoxyethylene alkylamides, polyacrylamides, polyols and acetylenic glycols. Preferred additives are sold under the trademarks Nalco and Superfloc.

To obtain strong extrudates, it is preferred to include, prior to extrusion, at least one compound which acts as a peptising agent for the refractory metal oxide. For example, a peptising agent for titania may be included prior to extrusion. Suitable peptising agents are well known in the art and include basic and acidic compounds. Examples of basic compounds are ammonia, ammonia-releasing compounds, ammonium compounds or organic amines. In case of a calcination step after shaping, such basic compounds are removed upon calcination and are not retained in the extrudates. This is advisable as such basic compounds may impair the catalytic performance of the final product. Preferred basic compounds are organic amines or ammonium compounds. A most suitable organic amine is ethanol amine. Suitable acidic peptising agents include weak acids, for example formic acid, acetic acid, citric acid, oxalic acid, and propionic acid.

Optionally, burn-out materials may be included prior to extrusion, in order to create macropores in the resulting extrudates. Suitable burn-out materials are commonly known in the art.

The total amount of flow-improving agents/extrusion aids, peptising agents, and burn-out materials in the carrier material to be extruded preferably is in the range of from 0.1 to 20% by weight, more preferably from 0.5 to 10% by weight, on the basis of the total weight of the mixture that is extruded.

A catalyst prepared according to the process of the present invention may be activated. Activation may be performed by reducing the catalytically active metal of the catalyst. Activation of a fresh prepared catalyst can be carried out in any known manner and under conventional conditions. For example, the catalyst may be activated by contacting it with hydrogen or a hydrogen-containing gas, typically at temperatures of about 200° to 350° C.

The invention further relates to a catalyst that is prepared according to the method of the present invention, said catalyst comprising 0.13-3, more preferably 0.15-3, even more preferably 0.15-2, still more preferably 0.15-1, still more preferably 0.15-1, still more preferably 0.15-0.7, most preferably 0.15-0.5, or 0.2-1, more preferably 0.2-0.7, even more preferably 0.2-0.5 weight percent of the element chlorine, calculated on the total weight of the catalyst.

The invention further relates to the use of such a catalyst in a Fischer-Tropsch process.

It was found that catalysts can be prepared that are stable over a long period of time. Another advantage is that catalysts can be prepared showing an increased selectivity towards $C_5+$ hydrocarbons as compared to similar catalysts that have been prepared without chlorine. A further advantage is that catalysts can be prepared showing a decreased selectivity towards carbon dioxide as compared to similar catalysts that have been prepared without chlorine. Additionally, catalysts can be prepared that are well able to withstand a high-speed stop in a Fischer-Tropsch process.

The process of the current invention is suitable to prepare fixed bed catalysts, slurry catalysts, i.e. powder like catalysts, and immobilized slurry catalyst, for example wire structures coated with catalyst material. The catalyst prepared with the process of the invention preferably comprises catalyst particles which are fixed bed particle(s) larger than 1 mm, or immobilised slurry particles larger than 1 mm.

Examples of suitable immobilized slurry catalysts to which the process of the present invention can be applied are catalysts with a size larger than 1 mm which catalysts comprise a substrate, for example a metal substrate such as a stainless steel wire substrate, and catalyst material comprising titania and cobalt.

The immobilized slurry catalyst may, for example, be in the form of a fixed structure (or arranged packing) such as gauze, corrugated sheet material that may or may not be perforated with holes, woven or non-woven structure, honeycomb, foam, sponge, mesh, webbing, foil construct, woven mat form, wire, ball, cylinder, cube, sphere, ovoid, monolith, or any combination of these.

The present invention especially relates to a process that can be used to prepare fixed bed catalysts, such as pellets and extrudates larger than 1 mm. Particles having a particle size of at least 1 mm are defined as particles having a longest internal straight length of at least 1 mm.

The heating step (b) may, for example, be performed in air, under hydrogen or a hydrogen comprising gas, or under an inert gas, preferably in air.

In one embodiment of the process according to the invention, the catalyst may be reduced with hydrogen or a hydrogen comprising gas after heating step (b). The catalyst may be reduced with hydrogen or a hydrogen comprising gas during and/or after the heating step. Reduction may be formed, for example, at a temperature in the range of between 200 and 350° C. for 5 minutes up to several days.

The present invention also provides a catalyst that can be obtained by the processes of the current invention.

The present invention also provides a process comprising the use of a catalyst according to the invention in a Fischer-Tropsch synthesis process. The invention relates to a process for performing a Fischer-Tropsch reaction comprising the following steps:
providing syngas to a reactor, said reactor comprising catalyst particles that have been prepared using a process according to the present invention;
providing the following process conditions in the reactor: a temperature in the range from 125 to 350° C., a pressure in the range from 5 to 150 bar absolute, and a gaseous hourly space velocity in the range from 500 to 10000 Nl/l/h;
removing Fischer-Tropsch product from the reactor.

The Fischer-Tropsch process is well known to those skilled in the art and involves synthesis of hydrocarbons from syngas, by contacting the syngas at reaction conditions with the Fischer-Tropsch catalyst.

The synthesis gas can be provided by any suitable means, process or arrangement. This includes partial oxidation and/or reforming of a hydrocarbonaceous feedstock as is known in the art. To adjust the $H_2/CO$ ratio in the syngas, carbon dioxide and/or steam may be introduced into the partial oxidation process. The $H_2$/CO ratio of the syngas is suitably between 1.5 and 2.3, preferably between 1.6 and 2.0.

The syngas comprising predominantly hydrogen, carbon monoxide and optionally nitrogen, carbon dioxide and/or steam is contacted with a suitable catalyst in the catalytic conversion stage, in which the hydrocarbons are formed. Suitably at least 70 v/v % of the syngas is contacted with the catalyst, preferably at least 80%, more preferably at least 90%, still more preferably all the syngas.

A steady state catalytic hydrocarbon synthesis process may be performed under conventional synthesis conditions known in the art. Typically, the catalytic conversion may be effected at a temperature in the range of from 100 to 600° C., preferably from 150 to 350° C., more preferably from 175 to 275° C., most preferably 200 to 260° C. Typical total pressures for the catalytic conversion process are in the range of from 5 to 150 bar absolute, more preferably from 5 to 80 bar absolute. In the catalytic conversion process mainly $C_5+$ hydrocarbons are formed.

A suitable regime for carrying out the Fischer-Tropsch process with a catalyst comprising particles with a size of least 1 mm is a fixed bed regime, especially a trickle flow regime. A very suitable reactor is a multi-tubular fixed bed reactor.

EXPERIMENTAL

Measurement Method; Activity

Catalytic activities can be measured, for example, in a model Fischer-Tropsch reactor. The catalytic activities measured may be expressed as space time yield (STY) or as an activity factor, whereby an activity factor of 1 corresponds to a space time yield (STY) of 100 g/l·hr at 200° C.

Sample Preparation

Fixed bed particles were prepared as follows. Mixtures were prepared containing titania powder, cobalt hydroxide, manganese hydroxide, water and several extrusion aids. Depending on the experiment, no or a specific chlorine comprising compound was added to the mixture. The mixtures were kneaded. The mixtures were shaped using extrusion. The extrudates were dried and/or calcined. The obtained catalysts contained about 20 wt % cobalt and about 1 wt % of manganese.

A part of the catalyst particles that was prepared without adding a chlorine comprising compound was used as reference (Comparative Examples). As one or more of the ingredients used comprised a very small amount of chlorine or chlorine components, the Comparative Examples comprised a very small amount of chlorine. Several batches were prepared, with slightly different properties.

The comparative examples and the examples according to the invention were tested under different conditions. The experimental data can be compared per measurement set as presented below.

Examples 1-7

Catalyst particles which were prepared as described above were prepared without adding a chlorine comprising compound in step (a), and were heated in step (b) at 300° C. This is referred to as Comparative Example 1.

Catalyst particles which were prepared as described above were prepared with different amounts of cobalt chloride ($CoCl_2$) in step (a), and then heated in step (b) at 300° C. The prepared catalysts comprised 0.1 to 1.4 weight percent of the element chlorine, calculated on the total weight of the catalyst. These catalysts are further referred to as Examples 1 to 3.

Catalyst particles which were prepared as described above were prepared with hydrochloric acid (HCl) in step (a), and then heated in step (b) at 300° C. These catalysts are further referred to as Example 4.

Catalyst particles which were prepared as described above were prepared without adding a chlorine comprising compound in step (a). Instead, cobalt nitrate (Co(NO3)2) was added in an amount equivalent to 2.5 wt % Co, calculated on the weight of the prepared catalyst. This is referred to as Comparative Example 2.

Catalyst particles which were prepared as described above were prepared without adding a chlorine comprising compound in step (a), and were heated in step (b) at 595° C. This is referred to as Comparative Example 3.

Catalyst particles which were prepared as described above were prepared with different amounts of cobalt chloride ($CoCl_2$) in step (a), and then heated in step (b) at 595° C. These catalysts are further referred to as Examples 5 and 6. After the drying the chlorine content was determined.

The catalyst particles were reduced with hydrogen.

The performance of each of the different samples prepared was tested using the following conditions in a Fischer-Tropsch reactor: a H2/CO ratio of 1.1, 25% N2, 60 bar, and 215° C. The selectivity of each of the samples was determined at 30% CO conversion after 70-90 hours time on stream. The test results are summarized in Table 1.

TABLE 1

| Sample | Cl comp. used | Heating temp (° C.) | Cl added (wt %) | Cl content after drying (wt %) | C5+ select. (%) |
|---|---|---|---|---|---|
| Comp. Ex1 | — | 300 | 0 | 0.11 | 88.5 |
| A1 | CoCl2 | 300 | 0.15 | 0.20 | 90.7 |
| A2 | CoCl2 | 300 | 0.75 | 0.45 | 92.3 |
| A3 | CoCl2 | 300 | 3 | 1.42 | 92.3 |
| A4 | HCl | 300 | 0.18 | 0.21 | 91.0 |
| Comp. Ex2, Co(NO3)2 | — | 300 | 0 | 0.11 | 87.7 |
| Comp. Ex3 | — | 595 | 0 | 0.075 | 86.6 |
| A6 | CoCl2 | 595 | 0.15 | 0.096 | 87.5 |
| A7 | CoCl2 | 595 | 0.75 | 0.112 | 87.6 |

From these experiments is clear that an increased amount of chlorine results in a higher selectivity towards C5+ hydrocarbons. This effect is thus seen for impregnation with metal chloride salts as well as for impregnation with HCl.

From these experiments is clear that an increased amount of chlorine results in a higher selectivity towards C5+ hydrocarbons.

The effects measured for the carbon C5+ selectivity is clearly due to the chloride which is impregnated, not to the cobalt. A very small amount of cobalt added to the 20 wt % cobalt comprising catalyst does not have a significant effect.

That which is claimed is:

1. A process for the preparation of a Fischer Tropsch catalyst, consisting of the steps of:
    (a) contacting
        cobalt and/or a cobalt compound;
        at least one promoter;
        one or more metal salts of chloride, hydrochloric acid (HCl), one or more organic chloride compounds, or a combination thereof; and a liquid;
optionally one or more co-catalyst(s) or precursor(s) therefor;
with titania;
(b) drying the material obtained in step (a) at a temperature in the range of 70 to 350° C.,
whereby the material obtained in step (b) comprises:
at least 5 weight percent cobalt, calculated on the total weight of the catalyst,
in the range of between to 0.1 to 15 weight percent promoter, calculated on the total weight of the catalyst,
and 0.13-4 weight percent of the element chlorine, calculated on the total weight of the catalyst.

2. A process according to claim 1, wherein a material is obtained in step (a) comprising 0.13-6 weight percent of the element chlorine, calculated on the total weight of the material obtained in step (a).

3. A process according to claim 1, wherein the liquid used in step (a) is water, ammonia, alcohol, ketone, aldehyde, aromatic solvent, or a mixture thereof.

4. A process according to claim 1, wherein the metal salt(s) of chloride with which the catalyst is contacted in step (a) is/are a chloride of manganese, cobalt, vanadium, titanium, silver, gold, zinc, platinum, palladium, zirconium, ruthenium, rhenium, rhodium, chromium, nickel, iron, osmium, or iridium or mixtures thereof.

5. A process according to claim 1, wherein fixed bed catalyst particle(s) larger than 1 mm, or immobilised slurry catalyst particles larger than 1 mm, are prepared.

6. A catalyst prepared according to any one of claims 1 to 5, said catalyst comprising 0.15-2 weight percent of the element chlorine, calculated on the total weight of the catalyst.

7. A process according to claim 1, wherein the at least one promoter is selected from the group consisting of manganese, rhenium, Group 8-10 noble metals, and mixtures thereof.

8. A process according to claim 7, wherein the Fischer-Tropsch catalyst comprises in the range of between to 0.1 to 15 weight percent manganese, rhenium, Group 8-10 noble metals, or mixtures thereof, calculated on the total weight of the catalyst.

9. A process for the preparation of a Fischer Tropsch catalyst, consisting of the steps of:
(a1) contacting
cobalt and/or a cobalt compound;
at least one promoter;
one or more metal salts of chloride, hydrochloric acid (HCl), one or more organic chloride compounds, or a combination thereof; and
a liquid;
optionally one or more co-catalyst(s) or precursor(s) therefor;
with titania, obtaining a mixture
(a2) shaping or forming catalyst particles by means of spray drying, pelletizing, (wheel) pressing or extruding the mixture obtained in step (a1), or application of the material obtained in step (a1) on a metal support (like a metal wire or a metal flake)
(b) drying the catalyst particle obtained in step (a2) at a temperature in the range of 70 to 350° C. to obtain the Fischer-Tropsch catalyst, whereby the Fischer-Tropsch catalyst obtained in step (b) comprises:
at least 5 weight percent cobalt, calculated on the total weight of the catalyst,
in the range of between to 0.1 to 15 weight percent promoter, calculated on the total weight of the catalyst,
and 0.13-4 weight percent of the element chlorine, calculated on the total weight of the catalyst.

10. A process according to claim 9, wherein the at least one promoter is selected from the group consisting of manganese, rhenium, Group 8-10 noble metals, and mixtures thereof.

* * * * *